(12) United States Patent
Scherr

(10) Patent No.: US 10,412,955 B2
(45) Date of Patent: Sep. 17, 2019

(54) DECOY STAND

(71) Applicant: Jeffrey Scherr, Bismarck, ND (US)

(72) Inventor: Jeffrey Scherr, Bismarck, ND (US)

( * ) Notice: Subject to any disclaimer, the term of this patent is extended or adjusted under 35 U.S.C. 154(b) by 0 days.

(21) Appl. No.: 15/468,383

(22) Filed: Mar. 24, 2017

(65) Prior Publication Data

US 2017/0273296 A1 Sep. 28, 2017

Related U.S. Application Data

(60) Provisional application No. 62/312,615, filed on Mar. 24, 2016.

(51) Int. Cl.
*A01M 31/06* (2006.01)

(52) U.S. Cl.
CPC .................. *A01M 31/06* (2013.01)

(58) Field of Classification Search
CPC ...... A01M 31/06; F16M 11/041; F16M 11/22
USPC .......... 43/3; 248/176.1, 152, 346.01, 346.03, 248/688, 127, 312, 310, 174, 440.1, 248/176.2, 117.1–117.7, 640, 146; 403/345, 359.6, 375, 381
See application file for complete search history.

(56) References Cited

U.S. PATENT DOCUMENTS

| | | | | |
|---|---|---|---|---|
| 722,682 A * | 3/1903 | Dills | .................... | A01M 31/06 43/3 |
| 762,333 A * | 6/1904 | Miller | .................... | D06F 79/00 248/117.5 |
| 861,627 A * | 7/1907 | Abbott | .................... | D06F 79/00 248/117.5 |
| 906,065 A * | 12/1908 | Pfunder et al. | ......... | D06F 79/00 248/117.5 |
| 929,093 A * | 7/1909 | Kuhn | ...................... | D06F 79/00 248/117.5 |
| 958,634 A * | 5/1910 | Griffeth | .................. | D06F 79/00 248/117.5 |
| 1,006,129 A * | 10/1911 | Richardson | ............... | F24H 6/00 126/275 E |
| 1,355,326 A * | 10/1920 | Galbraith | ................ | D06F 79/00 248/117.5 |
| 1,376,269 A * | 4/1921 | Galbraith | ................ | D06F 79/00 248/117.5 |
| 1,474,593 A * | 11/1923 | Jennings | ............... | A61J 9/0684 248/105 |
| 1,707,487 A * | 4/1929 | Langiaux | ................ | D06F 79/00 248/117.5 |
| 2,043,827 A * | 6/1936 | Breuer | .................. | A01M 31/06 43/3 |
| 2,791,390 A * | 5/1957 | Grommons | ............. | D06F 79/02 248/117.2 |
| 2,966,319 A * | 12/1960 | Todish | ................... | B63H 20/36 248/165 |

(Continued)

*Primary Examiner* — Ingrid M Weinhold
(74) *Attorney, Agent, or Firm* — Global Intellectual Property Agency, LLC; Daniel Boudwin

(57) ABSTRACT

A decoy stand. The decoy stand includes a base having a front end and a rear end, and a pair of support legs disposed on a lower side of the base, the support legs extending angularly and outwardly from the base. A slot is disposed on the base, the slot including an open end on the front end of the base and a closed end on the rear end of the base. The slot is configured to removably receive and releasably engage a keel of a decoy. A floating decoy having a keel can thus be supported by the decoy stand and used as a land decoy.

6 Claims, 3 Drawing Sheets

(56) References Cited

U.S. PATENT DOCUMENTS

| | | | | |
|---|---|---|---|---|
| 3,382,986 | A * | 5/1968 | Pfeiffer | A24F 9/14 131/260 |
| 3,894,377 | A * | 7/1975 | Welch | F16B 12/22 403/353 |
| 4,044,978 | A * | 8/1977 | Williams | B63H 20/36 248/640 |
| D268,796 | S * | 5/1983 | Kola | D6/349 |
| D268,863 | S * | 5/1983 | Fulster | D22/125 |
| D270,656 | S * | 9/1983 | Fulster | D22/125 |
| D282,043 | S * | 1/1986 | Morin | D6/406.6 |
| D286,836 | S * | 11/1986 | Ginouves | D6/690 |
| D302,619 | S * | 8/1989 | Catonzaro | D34/24 |
| 5,098,050 | A * | 3/1992 | Bruns | A01M 31/06 248/163.1 |
| 5,461,816 | A * | 10/1995 | Gazalski | A01M 31/06 43/3 |
| D365,136 | S | 12/1995 | Shaver et al. | |
| 5,749,555 | A * | 5/1998 | Albrecht | A47C 9/025 108/53.3 |
| 5,832,650 | A * | 11/1998 | Franceschini | A01M 31/06 43/3 |
| D435,993 | S * | 1/2001 | Johnson | D6/601 |
| 6,364,269 | B1 * | 4/2002 | Hofer | B62H 3/08 211/20 |
| 6,874,744 | B2 * | 4/2005 | Rawlings | F16M 11/041 248/130 |
| D536,933 | S * | 2/2007 | Perlman | D7/619.1 |
| 7,568,305 | B2 | 8/2009 | Fanfelle | |
| 8,127,487 | B2 | 3/2012 | Gazalski | |
| 8,136,288 | B1 | 3/2012 | Shope | |
| 2005/0252067 | A1 | 11/2005 | Wade | |
| 2005/0268522 | A1 * | 12/2005 | Foster | A01M 31/06 43/3 |
| 2008/0256838 | A1 * | 10/2008 | Fanfelle | A01M 31/06 43/3 |
| 2012/0223206 | A1 * | 9/2012 | Walton | B66F 5/00 248/346.03 |
| 2013/0083507 | A1 * | 4/2013 | Guirlinger | F16M 13/00 361/809 |
| 2013/0111800 | A1 | 5/2013 | Pifer et al. | |
| 2015/0313207 | A1 * | 11/2015 | Anson | A01M 31/06 43/3 |

\* cited by examiner

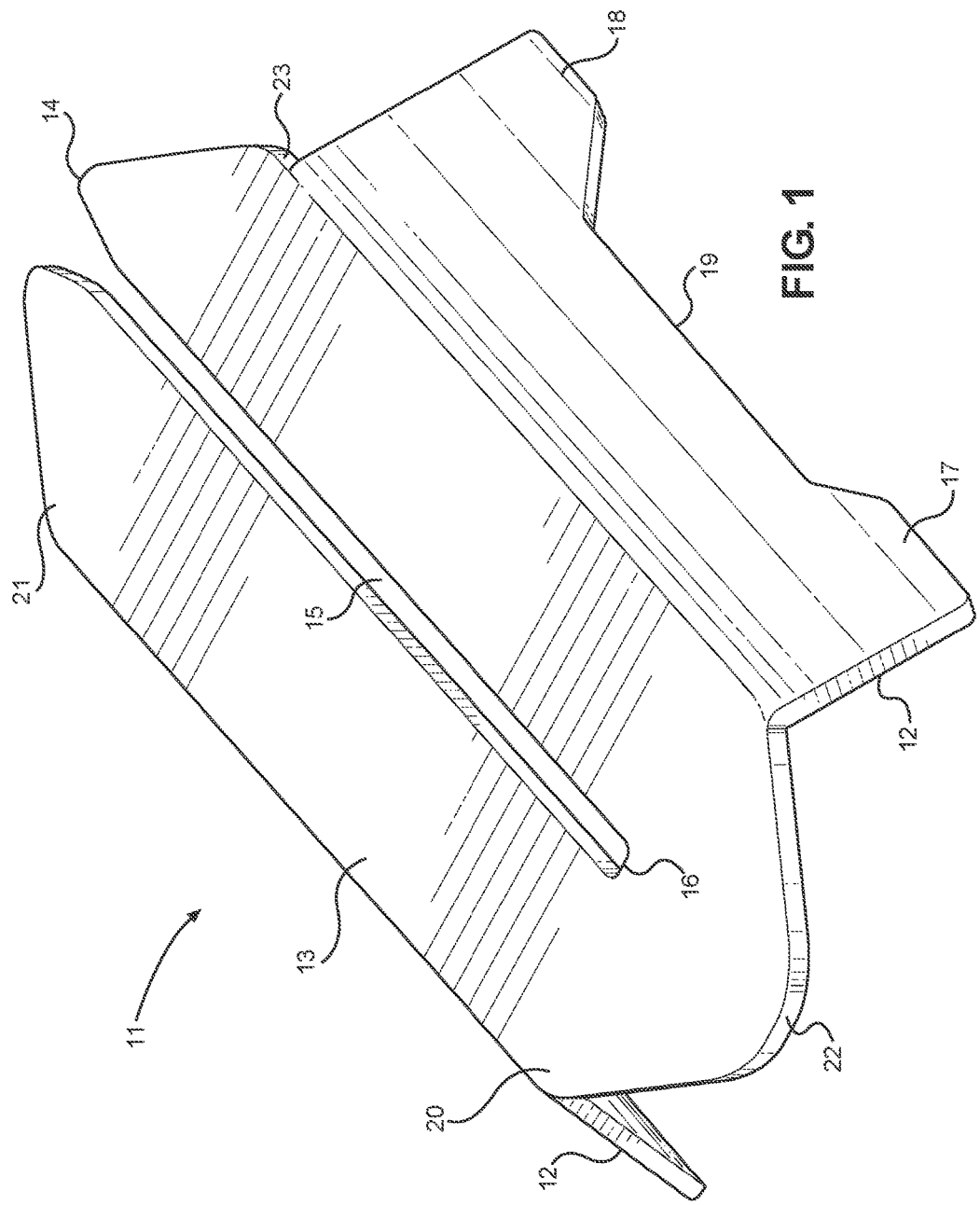

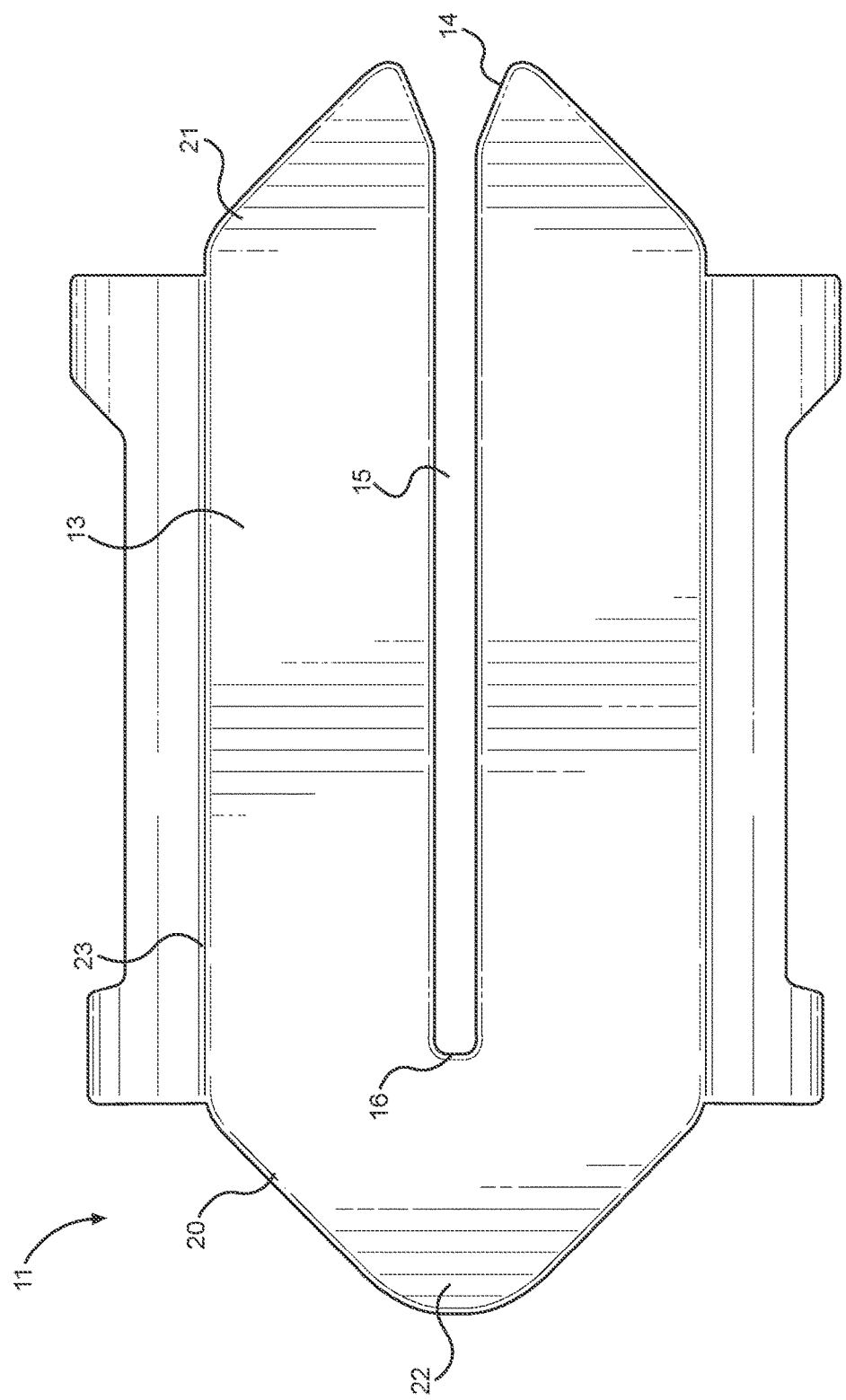

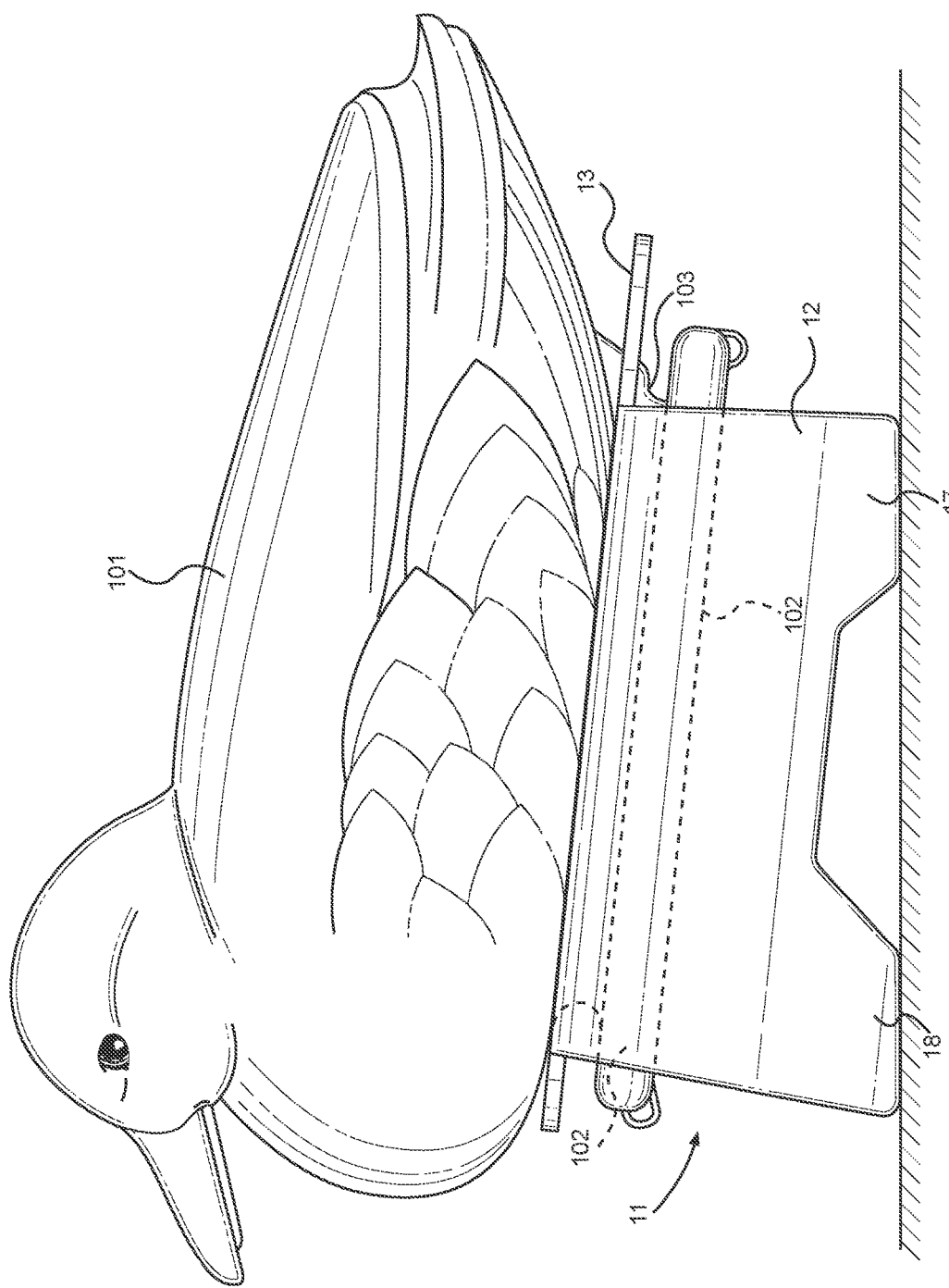

DECOY STAND

CROSS REFERENCE TO RELATED APPLICATIONS

This application claims the benefit of U.S. Provisional Application No. 62/312,615 filed on Mar. 24, 2016. The above identified patent application is herein incorporated by reference in its entirety to provide continuity of disclosure.

FIELD OF THE INVENTION

The present invention relates to waterfowl decoy stands. More specifically, the present invention provides a waterfowl decoy stand that allows users to support a floating decoy on land.

BACKGROUND OF THE INVENTION

Many individuals enjoy hunting ducks, geese, and other waterfowl. Hunters typically attract such game using decoys. Depending on the terrain, different types of decoys are available. Some decoys are buoyant and floated on a body of water to attract game. Other decoys include stands and are supported on dry land. An individual may employ one or both of these methods to attract game. However, typical land decoys are unable to be used in water, and likewise, typical floating decoys are unable to be used on land. The hunter must purchase or construct multiple types of decoys, which can be expensive and time consuming. It is therefore desirable to provide a decoy stand that can support a floating decoy on land, so that a single type of decoy may be utilized for either land or water-based hunting.

SUMMARY OF THE INVENTION

In view of the foregoing disadvantages inherent in the known types of decoy stands now present in the prior art, the present invention provides a decoy stand wherein the same can be utilized for providing convenience for the user when supporting a floating decoy on land. The present system comprises a base having a front end and a rear end, and a pair of support legs disposed on a lower side of the base, the support legs extending angularly and outwardly from the base, which provides stability in the field and allows multiple decoy stands to be stacked on one another for storage in a small space. A slot is disposed on the base, the slot having an open end on the front end of the base and a closed end on the rear end of the base. The slot is configured to removably receive and releasably engage a keel of a decoy.

Other objects, features, and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

FIG. 1 shows a perspective view of the decoy stand.

FIG. 2 shows an overhead view of the decoy stand.

FIG. 3 shows a side view of the decoy stand supporting a floating waterfowl decoy.

DETAILED DESCRIPTION OF THE INVENTION

Reference is made herein to the attached drawings. Like reference numerals are used throughout the drawings to depict like or similar elements of the decoy stand. For the purposes of presenting a brief and clear description of the present invention, the preferred embodiment will be discussed as used for supporting a floating decoy on dry land. The figures are intended for representative purposes only and should not be considered to be limiting in any respect.

Referring now to FIGS. 1 and 2, there is shown a perspective view of the decoy stand and an overhead view of the decoy stand, respectively. The decoy stand 11 generally comprises a base 13 having a pair of support legs 12 disposed on opposing sides thereof. The support legs 12 support the decoy stand 11 on the ground. The support legs 12 extend angularly and outwardly from the base 13. The base 13 and support legs 12 are made from a durable, weather-resistant material, such as plastic, metal or the like.

In the illustrated embodiment, the support legs 12 include a pair of opposing feet 17, 18 that surround a recessed portion 19. The feet 17, 18 provide additional stabilization for the decoy stand 11. The foot 18 disposed on the front end 21 is longer than the foot 17 disposed on the rear end 20. The difference in length of the feet 17, 18 causes the base 13 to be angled slightly when supported on the ground, such that when a decoy is secured thereto, the decoy mimics a natural standing position.

The base 13 further comprises a slot 15 thereon. The slot 15 is accessible via an open end 14 disposed on a front end 21 of the base 13, and terminates at a closed end 16 disposed on a rear end 20 of the base 13. The open end 14 is flared so that the keel of a decoy be easily inserted. The slot 15 is configured to receive and releasably engage the keel portion of a floating decoy. The keel freely slides within the slot 15, while the body of the decoy is supported by the base 13.

The rear end 20 of the base 13 includes an apex 22 formed by the tapering outer edges 23. The slot 15 extends toward the apex 22 of the base 13 from the open end 14. The closed end 16 of the slot prevents a decoy from sliding through the rear end 20 of the base 13. The width of the slot 15 can vary to accommodate decoys of different sizes.

Referring now to FIG. 3, there is shown a side view of the decoy stand supporting a floating waterfowl decoy. A typical floating decoy 101 includes a keel portion 102 that keeps it stable while floating in water. The floating decoy 101 can be secured to the decoy stand by grasping the head and sliding it into the slot. The slot (not visible) receives the keel 102, and a lower side of the decoy is supported by the base 13, while the base 13 is supported by the support legs 12 and opposing feet 17, 18. This allows the floating decoy to be repurposed and supported on land. In the illustrated embodiment, the slot is sized such that a rear portion 103 visibly extends out of the slot. In this way, an individual may grasp the exposed rear portion 103 of the keel 102 to facilitate insertion or removal of the decoy 101 from the slot.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A decoy stand, comprising:
a base having planar upper and lower surfaces, a front end, and a rear end;
a pair of support legs configured to support the base on a around surface, the support legs extending angularly and outwardly from the base in opposing directions such that a gap is defined between the support legs, each support leg including a pair of feet disposed on opposing sides of a recessed portion;
a slot disposed on the base, the slot comprising an open end on the front end of the base and a closed end on the rear end of the base;
wherein the slot is configured to removably receive and releasably engage a keel of a decoy;
wherein the open end is flared and includes a varying width, wherein the flared open end is coextensive with an elongated portion of the slot, the elongated portion including a constant width;
wherein each pair of feet includes a first foot having a first length and a second foot having a second length, wherein the first length is greater than the second length, such that
the pair of support legs are configured to support the base at an angle with respect to the ground surface such that the base is tilted upwardly with the front end being at a higher elevation than the rear end.

2. The decoy stand of claim 1, wherein the base further comprises an apex portion on the rear end thereof.

3. The decoy stand of claim 1, wherein the base comprises a planar upper surface.

4. The decoy stand of claim 1, wherein the base and support legs are composed of plastic.

5. The decoy stand of claim 1, wherein the base and support legs are composed of metal.

6. A decoy stand and decoy combination, comprising:
a base having planar upper and lower surfaces, a front end, and a rear end;
a pair of support legs configured to support the base on a around surface, the support legs extending angularly and outwardly from the base in opposing directions such that a gap is defined between the support legs, each support leg including a pair of feet disposed on opposing sides of a recessed portion;
a slot disposed on the base, the slot comprising an open end on the front end of the base and a closed end on the rear end of the base;
a decoy including a lower keel extending from a rear side of the decoy to a front side of the decoy;
wherein the slot is configured to removably receive the keel of the decoy;
wherein the slot includes a flared open end including a varying width, wherein the flared open end is coextensive with an elongated portion of the slot, the elongated portion including a constant width;
wherein each pair of feet includes a first foot having a first length and a second foot having a second length, wherein the first length is greater than the second length, such that
the pair of support legs are configured to support the base at an angle with respect to the ground surface such that the base is tilted upwardly with the front end being at a higher elevation than the rear end.

* * * * *